United States Patent [19]
Fitzhugh et al.

[11] Patent Number: 6,075,535
[45] Date of Patent: Jun. 13, 2000

[54] METHOD AND APPARATUS FOR VISUALIZING THE TILE ACCESS FREQUENCIES FOR TILED, MULTI-RESOLUTION IMAGES

[75] Inventors: Andrew Fitzhugh, Menlo Park; Tong Zheng, Mountain View; Michael Strittmatter, Los Altos, all of Calif.

[73] Assignee: Hewlett-Packard Company, Palo Alto, Calif.

[21] Appl. No.: 09/105,904

[22] Filed: Jun. 26, 1998

[51] Int. Cl.[7] .................................................. G06F 15/00
[52] U.S. Cl. .......................... 345/352; 345/902; 345/962; 705/10; 705/22; 705/27
[58] Field of Search .................................... 345/326, 348, 345/349, 352, 902, 962; 348/2; 349/2; 359/196; 430/394; 382/30, 61, 176, 190, 169, 239, 252, 173, 180; 707/11; 705/10, 22, 27

[56] References Cited

U.S. PATENT DOCUMENTS

| | | | |
|---|---|---|---|
| 5,034,991 | 7/1991 | Hagimae et al. | 382/30 |
| 5,226,098 | 7/1993 | Hirosawa | 382/61 |
| 5,307,198 | 4/1994 | Sullivan | 359/196 |
| 5,594,897 | 1/1997 | Goffman | 345/613 |
| 5,680,478 | 10/1997 | Wang et al. | 382/176 |
| 5,680,479 | 10/1997 | Wang et al. | 382/176 |
| 5,748,775 | 5/1998 | Tsuchikawa et al. | 382/190 |
| 5,751,852 | 5/1998 | Marimont et al. | 382/180 |
| 5,754,938 | 5/1998 | Herz et al. | 349/2 |
| 5,754,939 | 5/1998 | Herz et al. | 348/2 |
| 5,799,292 | 8/1998 | Hekmatpour | 706/11 |
| 5,835,087 | 11/1998 | Herz et al. | 345/327 |
| 5,848,181 | 12/1998 | Ogata | 382/169 |
| 5,848,184 | 12/1998 | Taylor et al. | 382/173 |
| 5,898,796 | 4/1999 | Kumashiro | 382/252 |
| 5,901,249 | 5/1999 | Ito | 382/239 |
| 5,905,020 | 5/1999 | Hu et al. | 430/394 |

*Primary Examiner*—Ba Huynh
*Attorney, Agent, or Firm*—Denise A. Lee

[57] ABSTRACT

The present invention provides a method and apparatus for visually presenting the access frequency of a two dimensional image. The method includes the steps of: determining which defined regions of the image are accessed; determining the frequency that the plurality of defined regions is accessed; creating a graphical representation corresponding to the plurality of defined regions for the image, wherein the x axis of the graphical representation corresponds to the x axis of the image and the y axis of the graphical representation corresponds to the y axis of the image; and combining the graphical representation with an access frequency indicator to create an access frequency output that corresponds to the plurality of defined regions. From the access frequency output, the user can see the access patterns of the image and can easily visualize how frequently small portions of the image are accessed.

8 Claims, 13 Drawing Sheets

METHOD AND APPARATUS FOR VISUALIZING THE TILE ACCESS FREQUENCIES FOR TILED, MULTI-RESOLUTION IMAGES

REFERENCE TO RELATED APPLICATIONS

Reference is made to the following co-pending and commonly assigned U.S. Patent Application entitled DYNAMIC GENERATION OF MULTI-RESOLUTION AND TILE-BASED IMAGES FROM FLAT COMPRESSED IMAGES [HP No. 10980837] and U.S. Patent Application entitled FLAT IMAGE DELIVERY SERVER [HP No. 10980808-1].

BACKGROUND OF THE INVENTION

The internet is a popular information gathering tool where visitors, seeking specific information, move from website to website. Often it is useful for the website host to gather and maintain information about a website visitor. Collection of website visitor information is one of the functions typically performed by the website log software. Typically, the web-server logs information related to website visitor requests including but not limited to: where the request came from, what document was requested, the time of the request, and who (identifier) the request was made by. In addition, the web server log typically will collect information related to the type of document accessed. For example, the website log software typically reports the file name and file type of requested documents. Based on the image file type, the website host typically can determine whether the requested document is an image or text file.

The internet is also becoming an increasingly popular tool for the sale of goods. Sellers hosting websites are with increasing frequency posting product brochures which include both text and image data. For consumer sales, it is particularly valueable for website hosts to know how often, and what areas of their website visitors are accessing so that the website content can be adjusted.

For example, say a product brochure includes an image file of a well dressed man. Visible in the image file is a jacket, pants, shirt, tie, belt and shoes. However, in the proposed scenario, the tie is not listed as one of the items for sale. If the website host knew that website visitors were repeatedly zooming in on the tie portion of the image file, the website host might change the website content of the product brochure to list the tie as an item for sale. Alternatively, if the tie was listed as an item for sale in a different location of the product brochure, the website host might modify the website content to either put the tie as an item for sale on the page associated with the image file or alternatively might provide a link that the visitor could use within the brochure to easily transfer the visitor to the page of the brochure where the tie is listed as an item for sale.

Typically, today's log analysis software presents access statistics that correspond to the entire image file and not just the portions of the image that are accessed. The image log access output may be presented graphically or numerically. Numerical representation of the image log access typically consists of a list of images and a number associated with each image corresponding to the number of accesses for the image. Graphical representation of the image log access typically consists of a bar corresponding to each image where the bar height varies according to the number of times a particular image is accessed. Unfortunately, these numerical and graphical results do not offer the viewer easily digestible insight into what portions of an image viewers are most interested in.

A method and apparatus for easily visualizing the frequency at which portions of an image are accessed is needed.

SUMMARY OF THE INVENTION

The present invention provides a method of visually presenting the access frequency of a two dimensional image. The method includes the steps of: dividing the input image into a plurality of defined regions; determining which of the defined regions of the image are accessed; determining the frequency that each of the plurality of defined regions is accessed; creating a graphical representation corresponding to each of the plurality of defined regions for the image, wherein the x axis of the graphical representation corresponds to the x axis of the image and the y axis of the graphical representation corresponds to the y axis of the image; and combining the graphical representation with an access frequency indicator to create an image access output that corresponds to each of the plurality of defined regions.

The present invention presents an image access output that can be easily used to visualize the frequency at which portions of the image are accessed. The frequency access output is a combination of a graphical representation of the image being accessed and a frequency indicator. In the preferred embodiment, the graphical representation of the image is a representation of the image pixels of the actual image where the x axis of the representation corresponds to the x axis of the image and the y axis of the representation corresponds to the y axis of the image.

In the preferred embodiment, the frequency indicator is a tonal variation that varies dependent on the number of times a particular defined region of the image is accessed. In the example, where a dark background is chosen, if the tonal variation of the frequency indicator is light or transparent when a particular defined region of the image is accessed frequently and darker or opaque when a particular defined region of the is not accessed, the viewer of the image access output will see the original image in the defined regions of the image that are accessed frequently and a darkened version of the image in the defined regions of the image that are infrequently accessed. Thus, the viewer of the image access output can see the access patterns of the image and can easily visualize how frequently small portions of the image are accessed. Providing access frequency data gives the viewer of the data more insight and value compared to a viewer who has access to data based on the entire image. Based on what specific tile areas of the image are viewed, the website owner may more intelligently vary the website content.

A further understanding of the nature and advantages of the present invention may be realized with reference to the remaining portions of the specification and the attached drawings.

DETAILED DESCRIPTION OF THE PREFERRED EMBODIMENTS

Figure 1:
FIG. 1 shows an original image.
Figure 2:
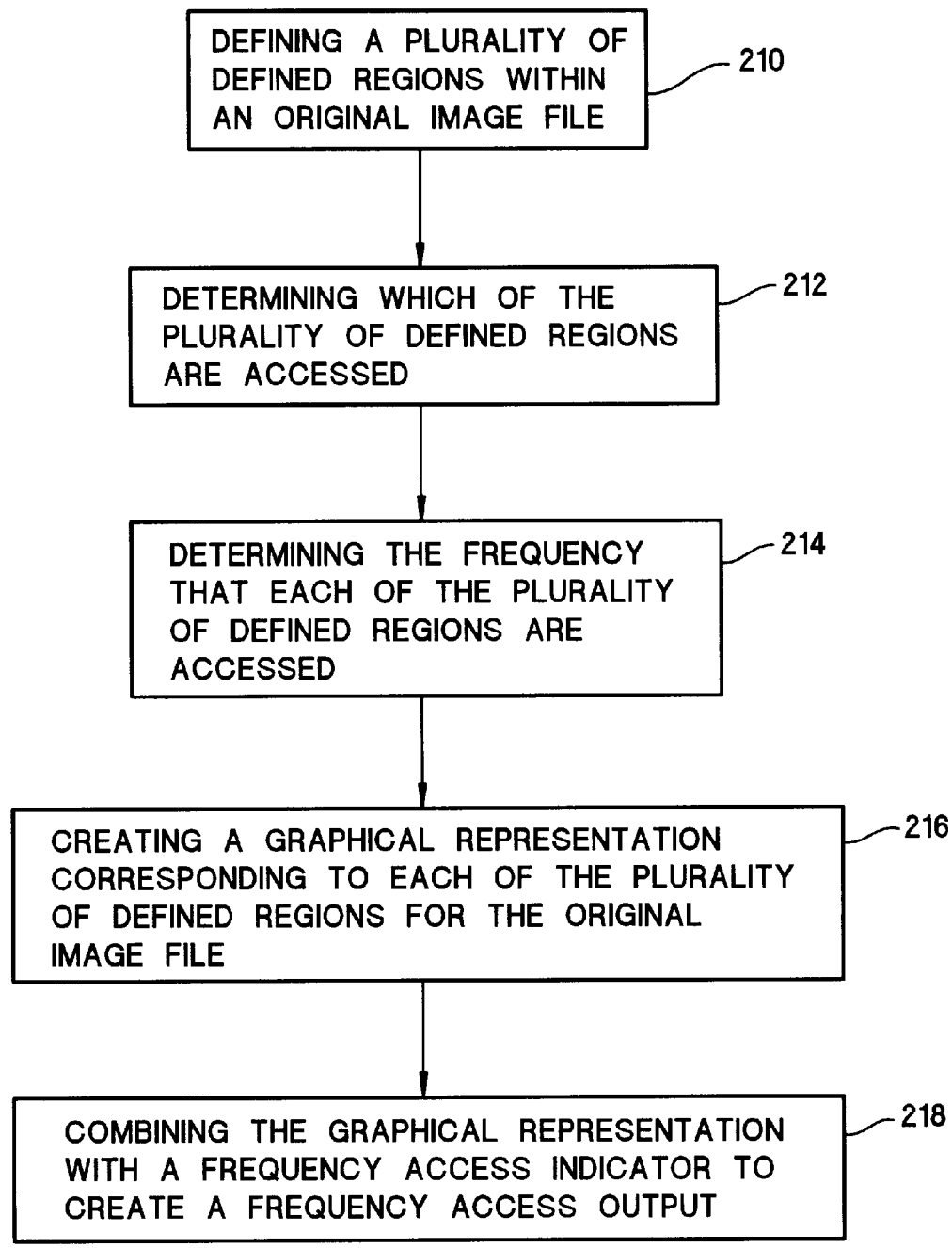
FIG. 2 shows a flowchart of the steps for visually displaying the frequency access of an image according to the present invention.

The present invention provides a method of visually presenting the frequency access of a two dimensional image. FIG. 1 shows an original image which is used for purposes of example within this application. FIG. 2 shows a flowchart 200 of the steps for creating an access frequency output that may be visually displayed. The method includes the steps of: defining a format for the original image such that the original image includes a plurality of defined regions 210; determining which of the plurality of defined regions of the original image are accessed 212; determining the frequency that each of the plurality of defined regions is accessed 214; creating a graphical representation corresponding to each of the plurality of defined regions for the original image 216, wherein the x axis of the graphical representation corresponds to the x axis of the original image and the y axis of the graphical representation corresponds to the y axis of the original image; and combining the graphical representation with an access frequency indicator 218 to create an access frequency output that corresponds to each of the plurality of defined regions.

The method includes the steps of: determining which defined regions of the image that are accessed 212 and determining the frequency that each of the plurality of defined regions is accessed 214. The present invention assumes that before the steps of determining which of the defined regions are accessed and determining the frequency that the plurality of defined regions is accessed, the original image is formatted into defined regions. The present invention assumes that image data may be requested or collected for the defined regions. The present application is intended to work in conjunction with image formats and protocols that allow the specification of a defined areas or regions within a single input image. Although not required, these image formats and protocols preferably allow the user to specify different resolution levels for a particular image.

Today's HTTP protocol allows data collection related to the entire image but do not allow data collection about defined areas or regions within an image. Thus, these image formats cannot support the steps of determining which defined regions of the image are accessed and determining the frequency that each of the plurality of defined regions is accessed.

Although other image formats that allow the specification of defined regions of the image may be used, in the preferred embodiment the Flashpix format and the Internet Imaging Protocol are used. Flashpix is an image format that supports multi-resolution images and provides fast local region access. Flashpix is discussed in Eastman Kodak Company, Flashpix Implemantation Guide, version 1.0, 1996. Internet Imaging Protocol (IIP) is a data transfer protocol for stored images. IIP establishes a mechanism for a client application to request image data and information from the server application. The Internet Imaging Protocol is discussed in the 1997 Hewlett Packard, Live Picture and Eastman Kodak Company Internet Imaging Protocol which is herein incorporated by reference.

In Flashpix and IIP, the image is divided into rectangular blocks, referred to as pixel tiles or tiles. Under the current Flashpix formatting standards, the image may be divided into 64×64 pixel tiles which may be individually specified. These tiles may be thought of as the equivalent of the defined regions in the present application, although defined region is intended to encompass a broader definition than a single rectangular unit. For example, defined region may include any region which may be specified by the user under the available format being used. For example, the defined region could include a group of adjacent tiles or nonadjacent tiles. If allowed by the format, the defined region may include the specification of non-rectangular areas.

After the regions of the image are defined, a determination is made as to how often the plurality of defined regions is accessed. Typically this is done in two steps: determining which of the plurality of defined regions of the original image are accessed 212; determining the frequency that plurality of defined regions is accessed 214. The user may be interested in viewing frequency access data for the entire image input or may specify that frequency access data should be collected for only a portion of the image. Typically, data is collected and a determination is made for each of the plurality of defined areas that the user is interested in viewing frequency access data for. The user may also specify that the frequency access data is collected over a predefined time period. In addition, the user may specify a particular website visitor or group of visitors that the website host is interested in viewing frequency access data for.

Included in the method for visually presenting an access frequency image is the step of creating a graphical representation of the original image 216. Predefined regions of the graphical representation should have a correspondence to each of the defined regions of the original image so that there is a correspondence between the graphical representation and the original image. The x axis of the graphical representation corresponds to the x axis of the original image and the y axis of the graphical representation corresponds to the y axis of the original image. In the preferred embodiment, the graphical representation of the image is a representation of the image pixels of the actual image. Thus, in the preferred embodiment, because the graphical representation is equivalent to the original image so there is a one to one correspondence between the graphical representation and the original image. However, in an alternative embodiment, the graphical representation could be a transformed version of the original image. For example, the transformed image could be a resized or enhanced version of the original image, the transformed image could includes modified color components, etc.

After the step creating a graphical representation corresponding to each of the plurality of defined regions for the original image 216, the graphical representation is combined with an access frequency indicator 218 to create an access frequency output that corresponds to each of the plurality of defined regions. In the preferred embodiment, the frequency indicator is a normalized count of the number of times a particular defined region of the image is accessed that can be visualized as a tonal variation. For example, lighter tones may represent a high number of accesses to a defined region while darker tones may represent a low number of accesses to defined regions. The frequency indicator is a graphical representation of the access frequency for defined regions of the original image. The frequency indicator is graphically combined with the portion of the image which it corresponds to.

The access frequency indicator is a parameter used to modulate the combination of the graphical representation of the original image and the background image. The background image is an image that typically is the same size as the original. The background image may be a solid color, or another image. In the preferred embodiment, the background image is a solid color (every pixel in the image is the same) that can be chosen dynamically by the user.

For the preferred embodiment where a background image is included, the access frequency output image can be mathematically represented by the equation $$finalPix = alpha*imgPix + (1.0-alpha)*bgPix \quad (1)$$

where finalPix is the access frequency output, imgPix is the graphical representation of the original image, alpha is the interpolation proportion and bgPix is the background image. Equation (1) is a standard linear interpolation between the original image and the background image, where the interpolation proportion, alpha, is derived from the access frequency indicator.

Figure 3A:
FIG. 3A shows a graphical representation of the original image.
Figure 3B:
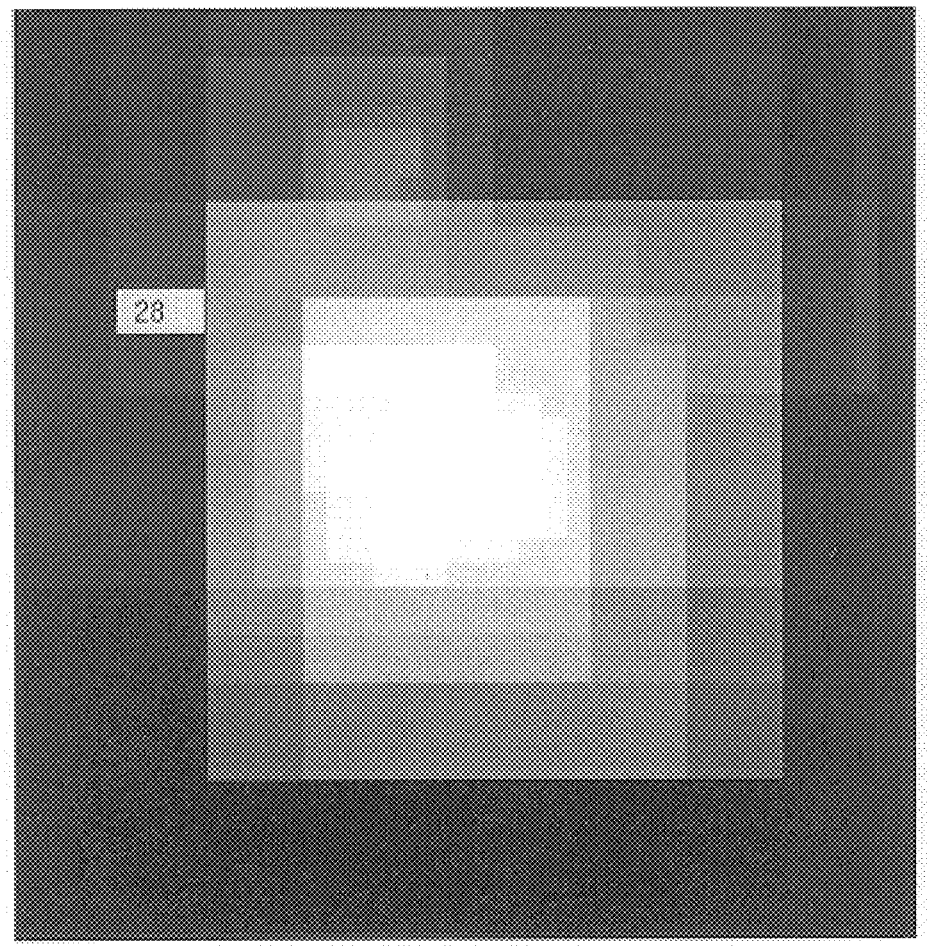
FIG. 3B shows a visualization of the frequency access indicators as tonal variations.
Figure 3C:
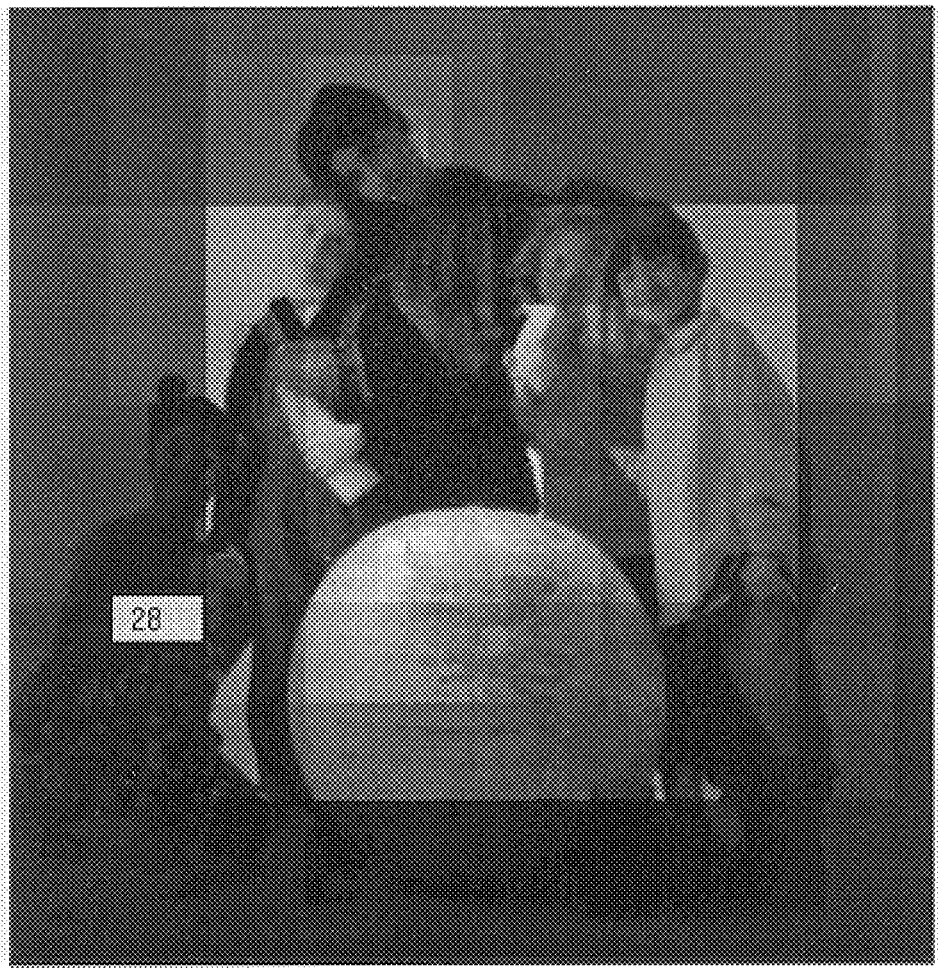
FIG. 3C shows the frequency access output file (the blending of the graphical representation of the original image and the background image, modulated by the access frequency indicator for each defined region.)

FIGS. 3A, 3B and 3B more clearly show the blending of the original image, frequency access indicator and background image. FIG. 3A shows a graphical representation of the original image. FIG. 3B shows a visualization of the frequency access indicators as tonal variations. FIG. 3C shows the frequency access output file (the blending of the graphical representation of the original image and the background image, modulated by the access frequency indicator for each defined region.) Representation of the this background image is a specific detail of the preferred embodiment and is not required in the general method.

Referring back to equation (1), in the preferred embodiment it is desirable to combine the images shown in FIG. 3 so that in the areas where the image is frequently accessed, the image dominates, and in areas where the image is rarely accessed, the background dominates. This can be implemented by carefully choosing alpha.

Alpha is a blending factor that determines the visibility of the graphical representation of the original image. Since in this particular embodiment, we wish to equate high access frequency with high visibility, alpha should be defined so as to achieve this effect. In the preferred embodiment, alpha is related to the access frequency indicator. However, other factors besides the frequency accesses may be of interest to the user and these image characteristic measures may also be of interest to a user and these systems may be varied by alpha. For example, alpha could be derived from an image characteristic measure indicating the probability of various image features such as specific colors, textures, human faces, etc. The image characteristic measure corresponds to the defined regions of the image.

In the preferred embodiment, the access frequency output is a blending between the original image and the background image, where the highest access frequency would be indicated by the original image, the lowest access frequency would be indicated by the background image, and intermediate access frequencies would be indicated by a blend of the original and background images. The proportion of the original image in the original background blend is chosen to be correlated to the access frequency of the corresponding image portion.

Figure 4A:
FIG. 4A shows an access frequency image where the background image is white and beta is equal to 0.
Figure 4B:
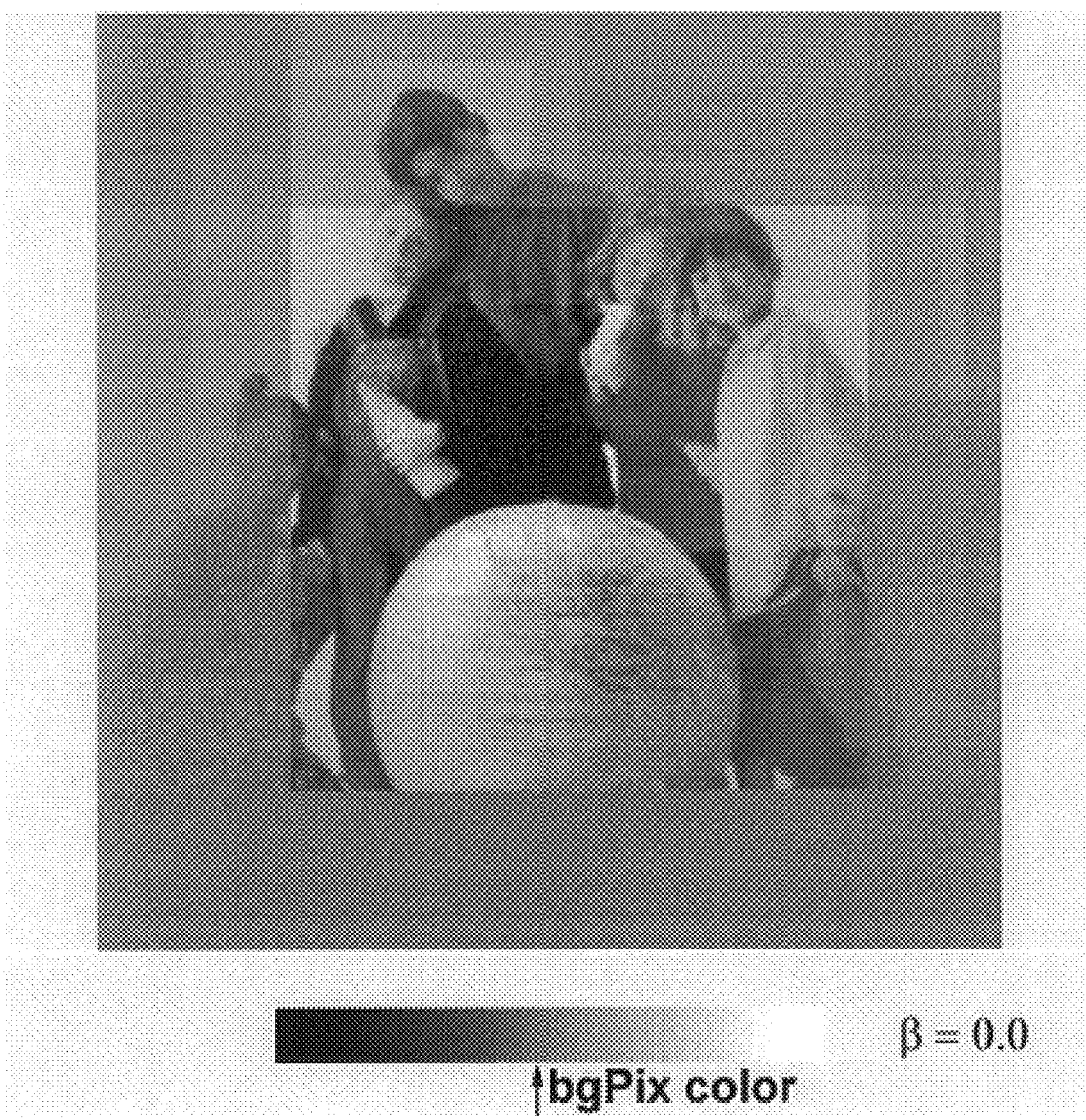
FIG. 4B shows an access frequency image where the background image is gray (in the range between black and white) and beta is equal to 0.
Figure 4C:
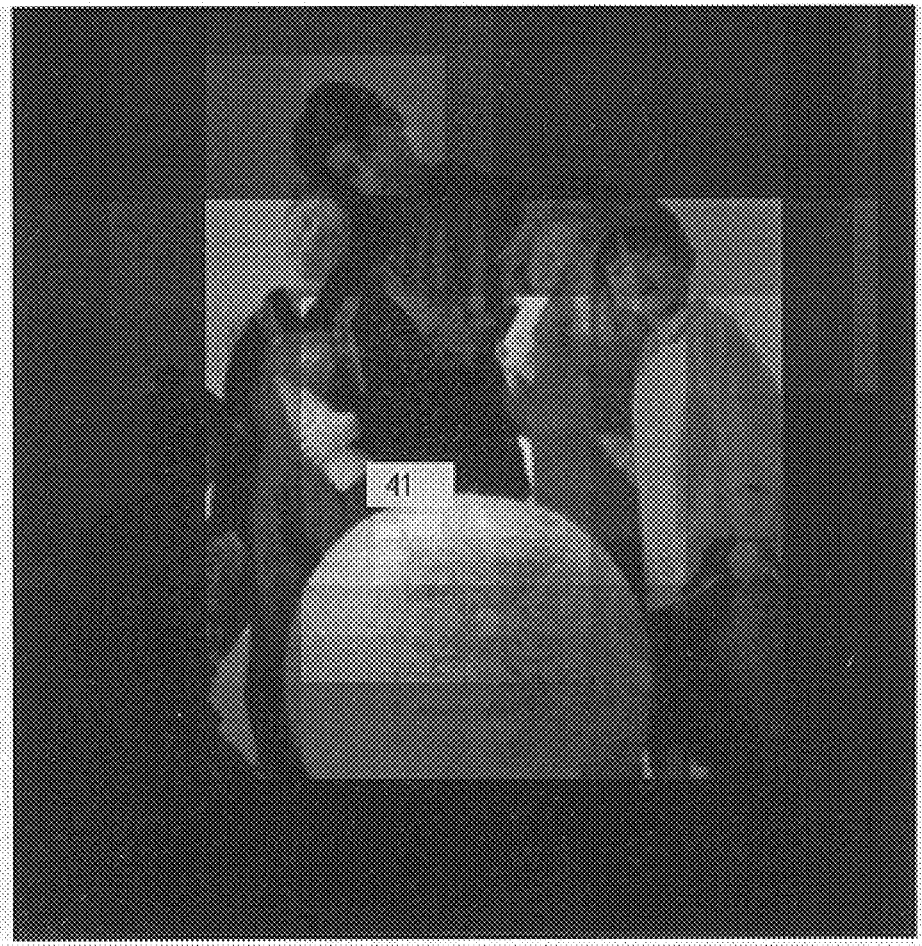
FIG. 4C shows an access frequency image where the background image is black and beta is equal to 0.

FIGS. 4A, 4B and 4C show the variation of the frequency access image for varying backgrounds. The arrow at the scale on the drawing of the Figures indicates the background color. FIG. 4A shows an access frequency output where the background image is white (bgPx=1). FIG. 4B shows an access frequency output where the background image is gray (bgPx=0.5). FIG. 4C shows an access frequency output where the background image is black (bgPix=0).

The access frequency output is a combination of a graphical representation of the image being accessed and a frequency indicator. Because the frequency indicators correspond to the defined regions of the original image, the user can easily visualize which portions of the original image are more or less frequently accessed. Thus, the present invention presents an image access output that can be easily used to visualize the frequency at which portions of the image are accessed.

If every defined region is accessed a minimum number of times, then the user will be more easily able to see the variation in the frequency accesses if this minimum number is subtracted from the total number of frequency accesses for each defined region being considered. In the preferred embodiment, the minimum number of accesses is subtracted from the range of accesses. In the preferred embodiment, alpha is the number of frequency accesses normalized to the range [0.0,1.0]. Although several methodologies may be used, in the preferred embodiment alpha is normalized as follows. Let fc1 be the set of all access counts and let min_freq be the minimum value of this set. For purposes of example, assume fc1 spans the range [3,652]. Let fc2 be the set of values computed by subtracting min_freq from each element of fc1. Thus, for the specified example fc2 spans the range [0,649]. Let max_freq be the maximum value in fc2. Let fc3 be the set of values computed by dividing each element of fc2 by max_freq. Thus, fc3 spans the range [0.0,1.0].

In one alternative embodiment, the graphical representation of the original image is completely obscured in the access frequency output (see for example, FIG. 3C.) In the preferred embodiment, the visual result is that the original image is never completely obscured in the final output. Having the graphical representation of the original image be in view, presents the data to the viewer in a more complete context.

Adding an offset, beta, to the normalized frequency counts ensures that the proportion of imgPix in the frequency access output finalPix, will never be zero. This may be implemented according to the following formula.

$$beta = 0.15$$

$$fc4 = fc3*(1.0-beta) + beta$$

Figure 5A:
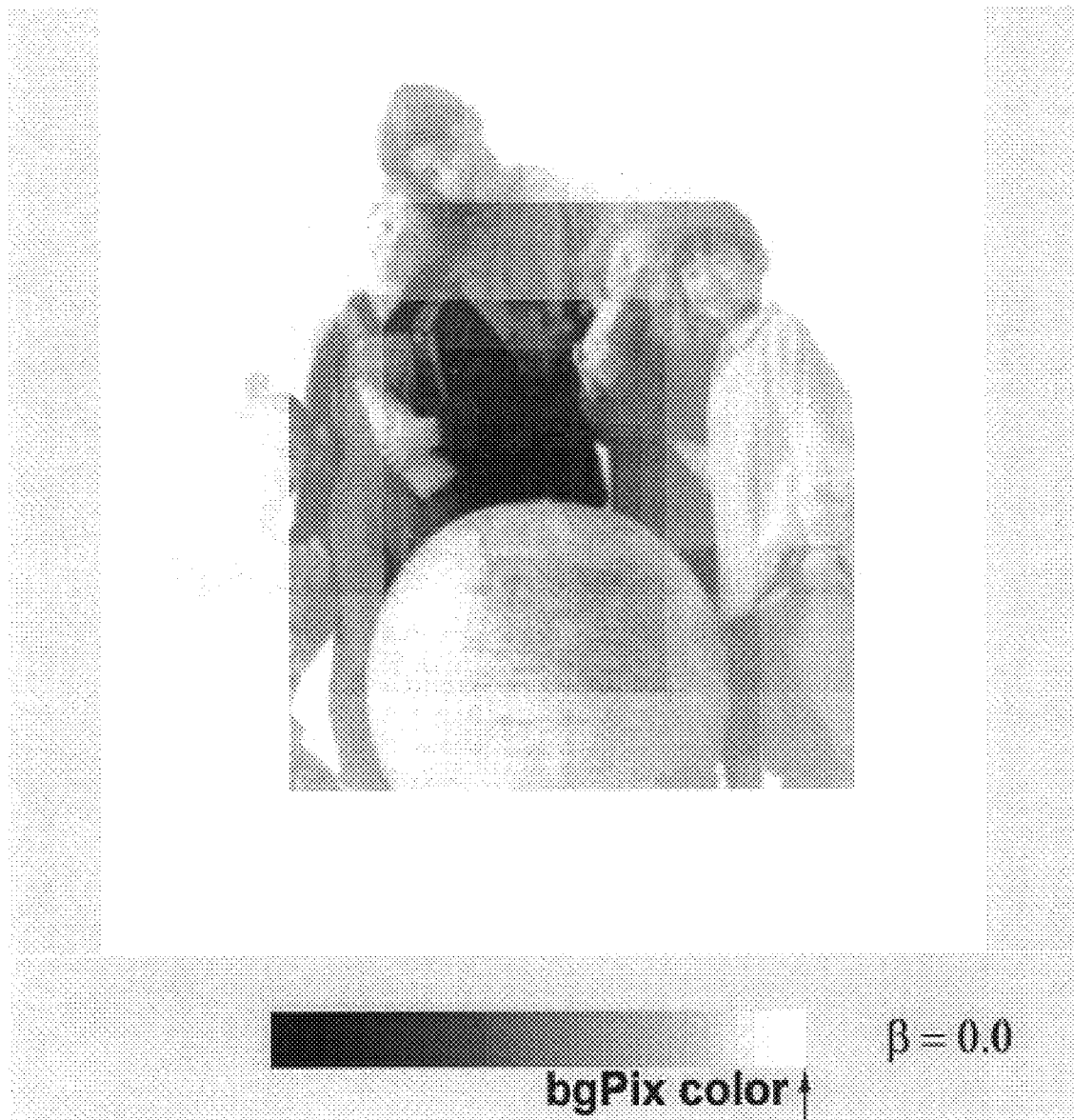
FIG. 5A shows an access frequency image where the background image is white where beta is 0.15.
Figure 5B:
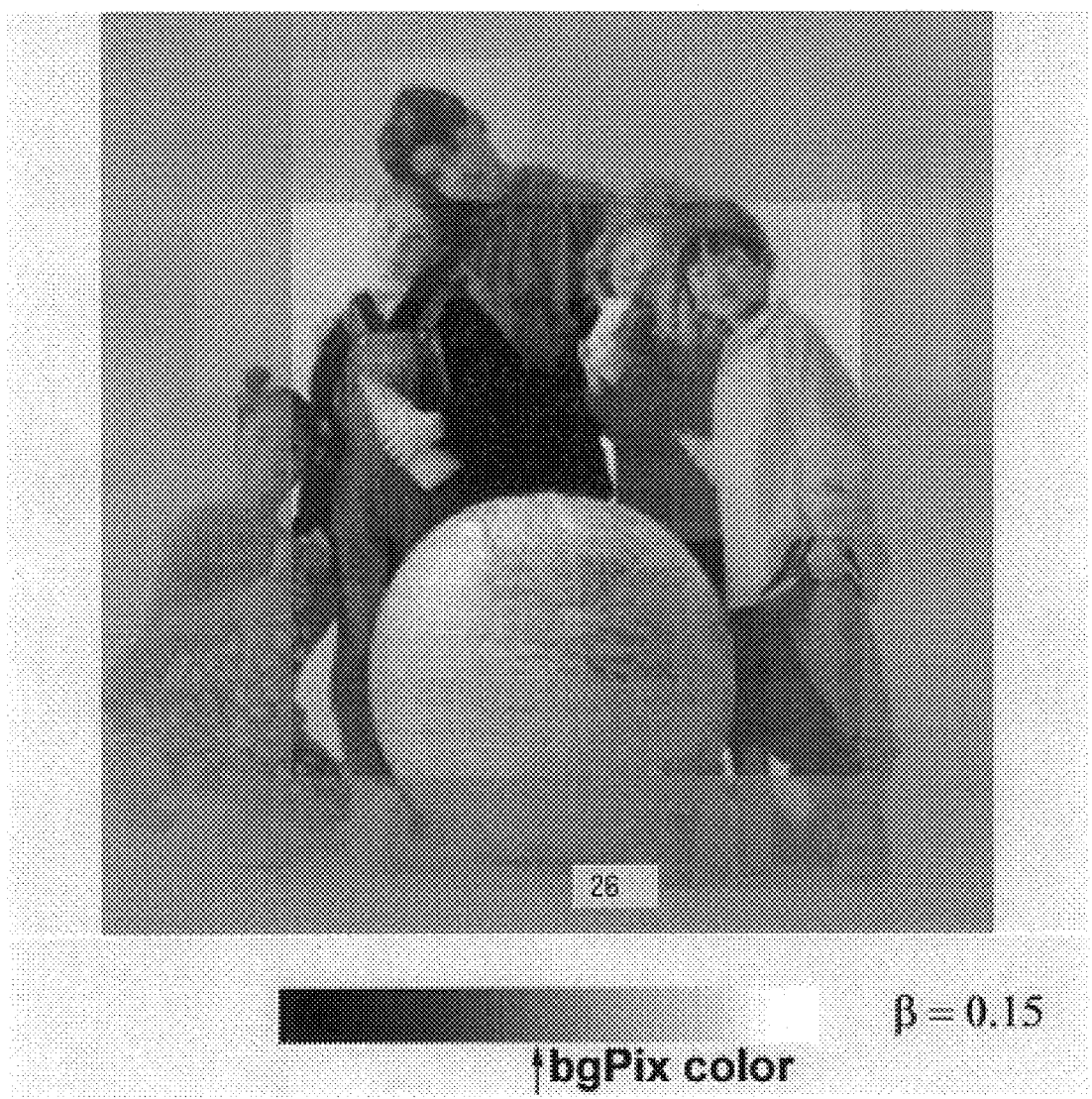
FIG. 5B shows an access frequency image where the background image is gray (in the range between black and white) and beta is equal to 0.15.
Figure 5C:
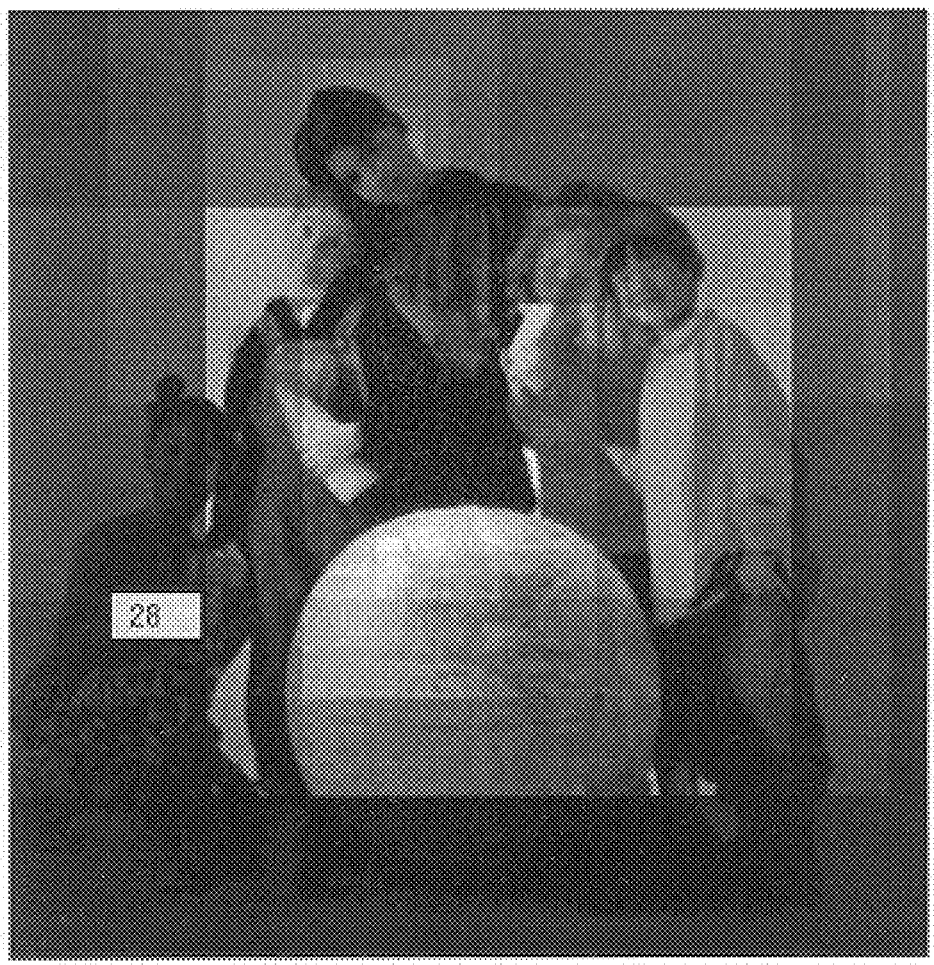
FIG. 5C shows an access frequency image where the background image is black and beta is equal to 0.15.

FIG. 5 shows an access frequency image where beta is equal to 0.15. In the preferred embodiment, beta is arbitrarily chosen to be 0.15. The value of beta is chosen so that the graphical representation will appear in the access frequency output but will not be so large as to make the areas that are frequently accessed not easily distinguishable from areas that are not frequently accessed.

Figure 6:
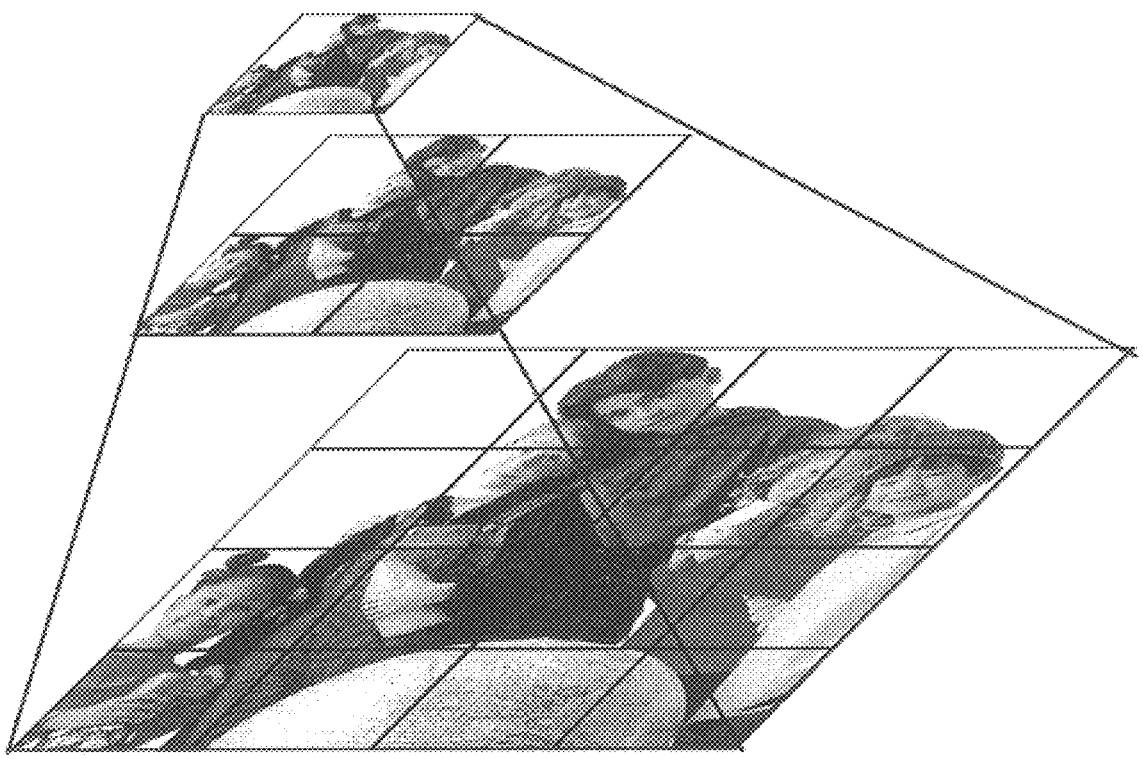
FIG. 6 shows how an area overlays higher resolution image representations in a resolution pyramid for an image.

As previously stated, in the preferred embodiment, the present invention is designed to work in conjunction with image formats and protocols that allow the user to specify different resolution levels for a particular image. Referring to FIG. 6 show a resolution pyramid for an image. Associated with each defined region are one or more bins for each defined region of the highest resolution level of the image. For each defined region that is requested, regardless of resolution, the bin(s) corresponding to the associated defined regions of the highest resolution level are incremented. An access of the lowest resolution defined region thus adds one count to every bin when it is accessed. Note that the bins are not concerned with resolution levels, but rather spatial areas, so accesses to different resolutions are "flattened" to a single resolution.

In one embodiment of the invention, the user can determine the access frequency for a particular tile of interest. In the preferred embodiment, this is achieved by the user pointing to the defined area of interest using a mouse. The access frequency count is shown as a numerical count. For example, in FIG. 5C the numerical count for the defined region specified by the user is 28.

In one embodiment of the invention, a distinction is made between the type of accesses or type of requests made for a particular document or image file. For example, a count might be kept for the number of times the image is printed and a separate count will be made for the number of times an image is viewed. Also, the user can specify a subset of the defined regions for the presenting frequency access or image characteristic data viewing even though data is collected for each of the defined regions within the image. In this case, the steps recited for the defined regions may not need to be performed for each of the plurality of defined regions.

Figure 7:
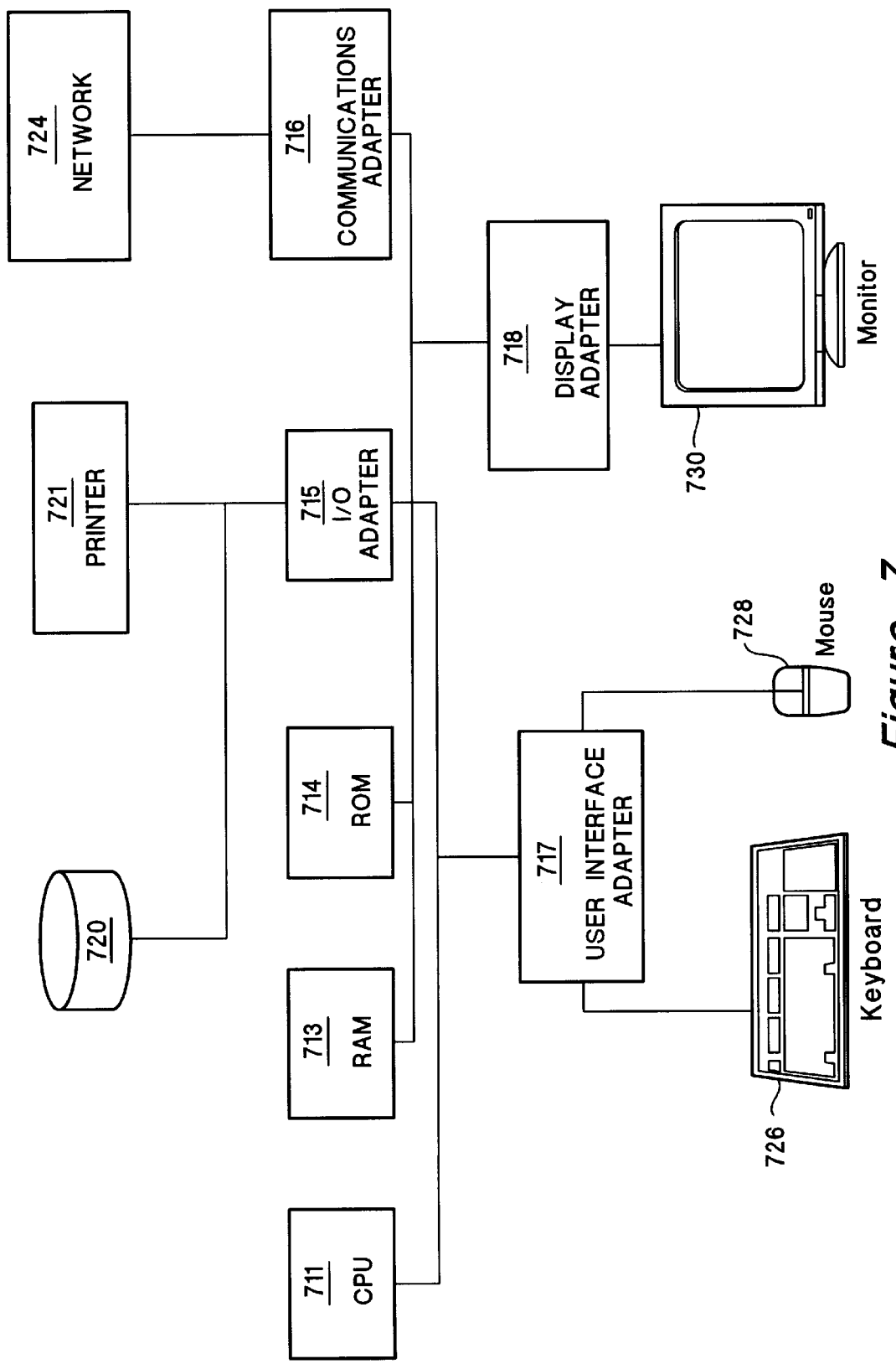
FIG. 7 is a high-level block diagram of a computer system adapted to execute the software for implementing the method according to the present invention.

FIG. 7 is a high-level block diagram of a computer system adapted to execute the method according to the present invention. Central processing unit 711 is coupled to the bus 712, which in turn is coupled to random access memory (RAM) 713, read only memory (ROM) 714, input/output (I/O) adapter 715, a communication adapter 716, user interface adapter 717, and display adapter 718.

CPU 711 may be any general purpose CPU. RAM 713 and ROM 714 hold user and system data and programs as is well known in the art. I/O adapter 715 connects storage devices, such as hard drive 720 to the computer system. Communications adapter 716 couples the computer system to a network 724. User interface adapter 717 couples user interface devices such as a keyboard 726 and pointing device 728 to the computer system. Finally, display adapter 718 is driven by CPU 711 to control the display on display device 730.

As is well known in the art, the method recited for the present invention may be implemented in software using a high-level computer language. Such software program is typically stored in a storage medium such as RAM 713 or ROM 714 and may be visually displayed on the monitor 730 or printed on the printer 721.

It is understood that the above description is intended to be illustrative and not restrictive. For example, although the original images is typically a two dimensional image, the image can be multi-dimensional and the method recited can be extended to more than two dimensions, such that the graphical representation is multi-dimensional. For example, if the original image was a three dimensional image the graphical representation would correspond to the x, y and z axes of the original image. The access frequency indicator is displayed as a tonal variation. However, the image characteristic measure or access frequency indicator may be displayed in a variety of ways. For example, the image characteristic measure may be displayed as sample in a contour plot or a sample in a histogram. Alternatively, the image characteristic measure could be displayed as a vector, where the length of the vector corresponds to the access count. The scope of the invention should therefore be determined with reference to the appended claims, along with the full scope of equivalents to which such claims are entitled.

What is claimed is:

1. A method of visually presenting an image characteristic measure of at least a two dimensional image, the method including the steps of:

dividing an at least two dimensional image file representative of the at least two dimensional image into a plurality of defined regions;

determining which of the plurality of defined regions of the image file are to be measured;

determining an image characteristic measure for each of the plurality of defined regions;

creating a graphical representation of the image corresponding to each of the plurality of defined regions of the image file, wherein the x axis location of the graphical representation corresponds to the x axis location of the plurality of defined regions of the image file and the y axis location of the graphical representation corresponds to the y axis location of the plurality of defined regions of the image file; and combining the graphical representation with an image characteristic measure that corresponds to each of the plurality of defined regions to create an image characteristic output.

2. The method recited in claim 1 wherein the image characteristic measure is an access frequency indicator.

3. A method of visually presenting the access frequency of at least a two dimensional image, the method including the steps of:

dividing an at least two dimensional image file representative of the at least two dimensional image into a plurality of defined regions;

determining which of the plurality of defined regions of the image are accessed;

determining the frequency that each of the plurality of defined regions is accessed;

creating a graphical representation of the image corresponding to each of the plurality of defined regions of the image file, wherein the x axis location of the graphical representation corresponds to the x axis location of the plurality of defined regions of the image file and the y axis location of the graphical representation corresponds to the y axis location of the plurality of defined regions of the image file; and combining the graphical representation with an access frequency indicator to create an access frequency output that corresponds to the defined regions.

4. The method recited in claim 3 wherein the steps of determining which of the plurality of defined regions of the image that are accessed and determining the frequency that each of the plurality of areas is accessed is performed during a predetermined time period.

5. The method recited in claim 3 wherein the steps of determining which of the plurality of defined regions of the image are accessed and determining the frequency that each of the plurality of areas is accessed is performed for a predetermined visitor.

6. The method recited in claim 3 wherein the steps of determining which of the plurality of defined regions of the image that are accessed and determining the frequency that each of the plurality of areas is accessed is performed for a predetermined visitor.

7. The method recited in claim 3 wherein the steps of determining which of the plurality of defined regions of the image that are accessed and determining the frequency that each of the plurality of areas is accessed is performed for a predetermined group of visitors.

8. The method recited in claim 3 wherein the frequency access image is a histogram.

* * * * *